United States Patent [19]
Bachand

[11] 3,879,870
[45] Apr. 29, 1975

[54] TAG ASSEMBLY FOR ANIMAL COLLAR OR THE LIKE

[76] Inventor: George M. Bachand, 80 Roseanna Rd., Southington, Conn. 06479

[22] Filed: June 28, 1973

[21] Appl. No.: 374,685

[52] U.S. Cl. .............................................. 40/21 C
[51] Int. Cl. ............................................. G09f 3/14
[58] Field of Search ............... 40/5, 2, 107, 110, 21, 40/21 C; 119/106; 235/85 FC, 90; 116/134

[56] References Cited
UNITED STATES PATENTS

| 669,811 | 3/1901 | Sparks | 40/110 |
| 774,325 | 11/1904 | Illing | 40/110 |
| 1,328,019 | 1/1920 | Stewart | 40/21 R |
| 1,537,891 | 5/1925 | Shedd | 40/110 X |
| 2,001,679 | 5/1935 | Haughey | 40/2 R X |
| 2,264,516 | 12/1941 | Fisher | 40/110 |
| 2,880,701 | 4/1959 | Foster | 119/106 |
| 3,195,813 | 7/1965 | Hart | 235/90 |
| 3,330,060 | 7/1965 | Duncan | 40/107 |
| 3,477,409 | 11/1969 | Costanzo | 119/106 |
| 3,736,681 | 6/1973 | Chang | 40/21 C |

FOREIGN PATENTS OR APPLICATIONS

| 272,272 | 6/1927 | United Kingdom | 40/110 |
| 704,184 | 2/1954 | United Kingdom | 40/110 |

Primary Examiner—Robert W. Michell
Assistant Examiner—Wenceslao J. Contreras
Attorney, Agent, or Firm—McCormick, Paulding & Huber

[57] ABSTRACT

A tag assembly for an animal flea collar which remains potent for a period of approximately 3 months comprises an identification tag bearing indicia of 14 consecutive months arranged in chronological series and a date marker for releasable attachment to the tag in a selected one of a plurality of possible positions to cooperate with the indicia thereon to indicate a 3-month period which corresponds to the effective life of the collar.

16 Claims, 7 Drawing Figures

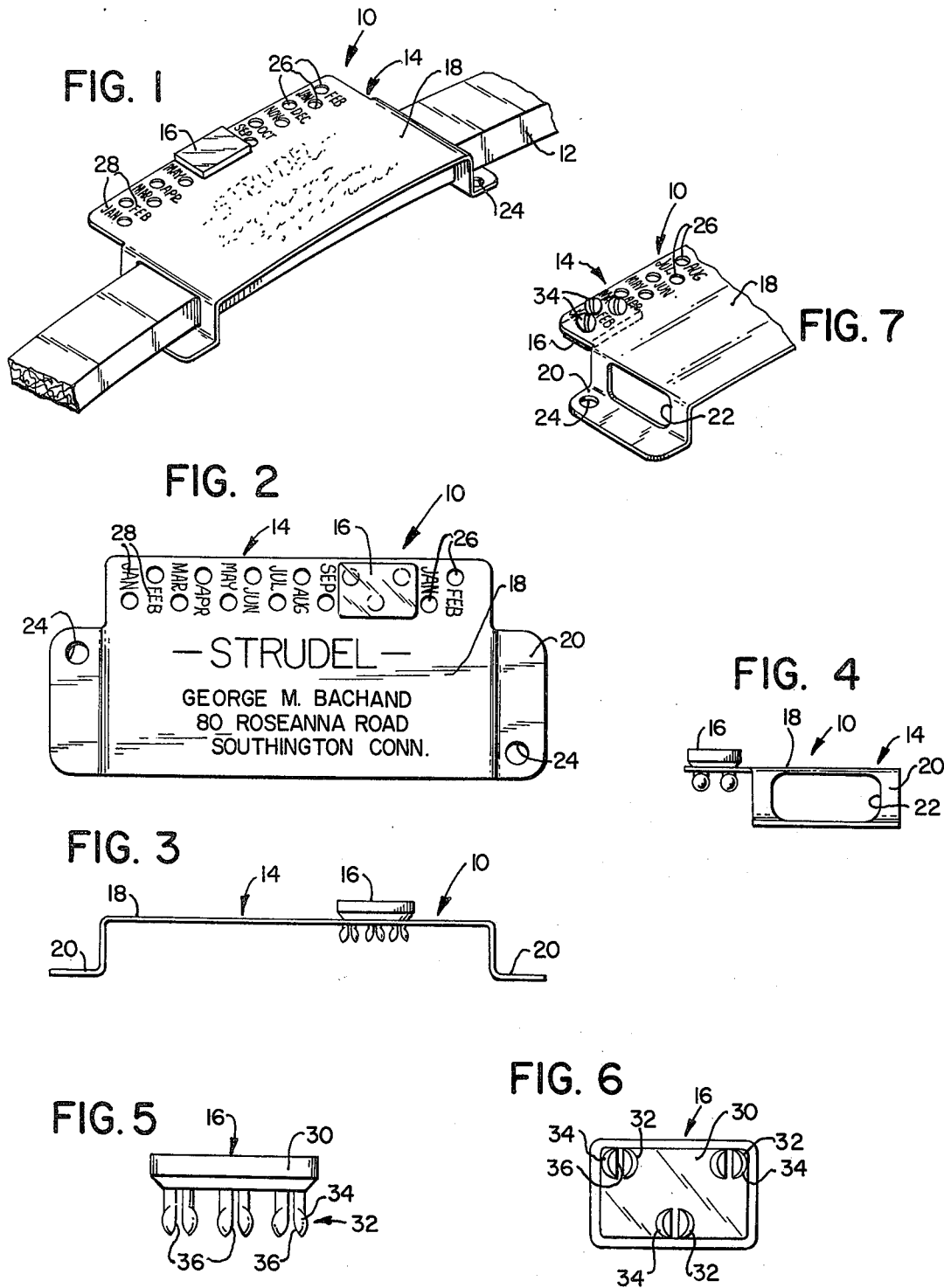

TAG ASSEMBLY FOR ANIMAL COLLAR OR THE LIKE

BACKGROUND OF THE INVENTION

This invention relates in general to a tag assembly and deals more particularly with an improved tag assembly which includes a tag and a marker for selective positioning on the tag to provide indication of at least one of a plurality of bits of prerecorded information on the tag.

The tag assembly of the present invention is particularly adapted for use as an animal identification tag and for attachment to an animal insecticide or flea collar to provide indication of the potency period thereof. A collar of the aforedescribed type for controlling fleas, ticks and the like is usually packaged in a sealed container, remains dormant in the container, but is effective for only a limited time after the container is opened. The tag assembly of the present invention provides convenient means for recording the potency period of such a collar when it is attached to an animal to assure replacement of the collar at a proper time for the continued comfort and well being of the animal.

SUMMARY OF THE INVENTION

In accordance with the present invention, an improved tag assembly is provided for attachment to an animal collar or the like and comprises an information tag having a plurality of informational characters thereon, a character marker, and means for securing the marker to the tag in a selected one of a plurality of positions to cooperate with at least one character on the tag to provide indication thereof.

BRIEF DESCRIPTION OF THE DRAWING

FIG. 1 is a fragmentary perspective view of a tag assembly embodying the present invention shown attached to an animal collar or the like.

FIG. 2 is a somewhat enlarged plan view of the tag assembly of FIG. 1.

FIG. 3 is a side elevational view of the tag assembly of FIG. 1.

FIG. 4 is an end elevational view of the tag assembly of FIG. 1.

FIG. 5 is a somewhat enlarged side elevational view of a character marker.

FIG. 6 is a bottom view of the character marker of FIG. 5.

FIG. 7 is a fragmentary perspective view of the tag assembly of FIG. 1, but illustrates another mounting position of the character marker on the information tag.

BRIEF DESCRIPTION OF THE PREFERRED EMBODIMENT

Turning now to the drawing and referring first particularly to FIG. 1, a tag assembly embodying the present invention and indicated generally by the numeral 10 is shown attached to or mounted on a strap or animal collar 12. The tag assembly 10 comprises an information tag indicated generally at 14 and a character marker 16 for attachment to the tag in a preselected position to cooperate with at least one character on the tag 14 to provide indication thereof. The illustrated collar 12 comprises an animal insecticide or flea collar. Such a collar for a cat or dog is usually marketed in a sealed container (not shown), remains dormant or inactive while sealed in the container, and is activated to emit insecticide upon removal from the container. Presently available collars of the aforedescribed type have a potency period of approximately three months. Accordingly, the tag assembly 10 hereinafter further described is particularly adapted for use with such a 3-month collar.

Considering now the tag assembly in further detail, the identification tag may be made from any suitable material and may vary in form. The illustrated tag 10 preferably comprises a plate formed from sheet metal which has a generally rectangular body portion 18 somewhat wider than the collar 12. Integral mounting brackets 20, 20 slightly wider than the strap 12 are bent downwardly and outwardly at opposite ends of the body portion 18. Each bracket 20 has a slot 22 formed therein to receive an associated portion of the collar 12 therethrough and which generally complements the cross-sectional configuration of the collar. Preferably, and as shown, each bracket 20 is also provided with a hole 24 in an associated marginal portion thereof to facilitate attachment of an animal license tag or the like. A plurality of apertures 26, 26 are formed in the body portion 18 for securing the character marker 16 in any one of a plurality of positions on the tag 14 as will be hereinafter discussed. Preferably, and as shown, the apertures 26, 26 are arranged in two parallel rows along a longitudinally extending marginal portion of the tag body 18. The information tag 18 also has a plurality of characters 28, 28 thereon, which, as shown, comprise first units of time or abbreviations of the names of months of the year arranged in chronological series. The first units of time collectively define a whole second unit of time or one full year and only a portion of the next chronologically successive year. As best shown in FIG. 2, each character 28 is disposed transversely adjacent an associated aperture 26, the apertures being equal in number to the number of characters 28, 28. In the illustrated case 14, apertures 26, 26 are provided and associated with the abbreviations of 14 consecutive months 28, 28 arranged chronologically, beginning with the month of January and ending with the month of February.

The character marker is adapted to be releasably retained in assembly with the identification tag in a selected one of a plurality of positions on the tag to provide indication of at least one character. As previously noted, the collar 12 has a potency of approximately 3 months, therefore, the illustrated character marker is constructed and arranged to cooperate with the information tag to provide indication of three characters representing 3 consecutive months.

The illustrated marker 16 is preferably molded from resilient plastic material and has a generally rectangular body 30 of sufficient size and shape to overlie and substantially cover three of the apertures 26, 26 and the characters 28, 28 associated with the latter apertures. At least one resilient teat projects from the marker body for snap-in engagement with an associated aperture in the information tag. However, the illustrated character marker 16 is provided with three teats 32, 32 which project from the lower surface of the body 30 as it is shown oriented in FIG. 5. Each teat 32 has a generally cylindrical shank portion, a partispherical end portion 34, and a slot 36 generally disposed in an axial plane of the shank portion to facilitate snap-in engagement in an associated aperture 26.

The three teats 32, 32 are arranged for complementary snap-in engagement with a series of three consecutive apertures 26, 26 in the tag 14.

When the insecticide collar 12 is removed from its sealed container for attachment to an animal, it is activated and begins to emit insecticide. The tag 14 is releasably retained on the collar 12 which is threaded through the slots 22, 22. The assembly is completed by positioning character marker 16 on the tag 14 to indicate the period of potency of the collar 12. Assuming that the collar is put into service in early October, the character marker is attached to the tag to cover indicia of the months of October, November and December as shown in FIG. 2. If, however, the tag is put into service in December, the character marker is installed at the right hand end of the tag 14 as it appears in FIG. 2 to cover the months of December, January and February. It will now be apparent that the names of 14 consecutive months are indicated on the tag so that the character marker may be applied thereto to provide indication of any 3 consecutive months which correspond to the effective life of the collar.

Referring now to FIG. 7, an alternate mounting position of the character marker is illustrated. As shown, the character marker 16 may be attached to the tag 14 with the teats 30, 30 extending upwardly through the apertures 26, 26 so that the parti-spherical end portions 34, 34 are disposed generally adjacent the names of 3 consecutive months and cooperate therewith to provide indication of the potency period of an associated collar. It has been found that the marker tag is less susceptible to being knocked or picked off of its associated information tag when mounted in the latter manner. Such mounting arrangement is recommended when the tag assembly is to be worn by a particularly active animal.

The tag assembly of the present invention has been illustrated and described with reference to a particular usage, however, it will now be apparent that tags embodying the present invention will be suitable for any use wherein it is desired to provide indication of one bit of a series of predetermined informational bits of future reference. It should be understood that such modified forms of the aforedescribed tag assembly are contemplated within the scope of the invention.

I claim:

1. A tag assembly for an animal insecticide collar having a limited potency period and comprising an information tag, characters indicating names of the months of 1 full year and only a portion of another full year arranged in chronological series on said information tag, means for attaching said information tag to an insecticide collar, a character marker, and means for securing said character marker to said information tag in a preselected one of a plurality of fixed positions, said character marker in each of said positions cooperating with a plurality of consecutive said characters to indicate a period of time substantially equal to the potency period of the collar.

2. A tag assembly as set forth in claim 1 wherein said means for securing said character marker comprises means for releasably securing said character marker to said information tag.

3. A tag assembly as set forth in claim 2 wherein said information tag has a plurality of apertures therethrough, said character marker has at least one resilient teat thereon for insertion into an associated one of said apertures, and said one teat and said associated aperture comprise said means for releasably securing said character marker.

4. A tag assembly as set forth in claim 3 wherein said one teat cooperates in snap engagement with said information tag to releasably secure said character marker to said information tag.

5. A tag assembly as set forth in claim 3 wherein said character marker has a plurality of teats thereon, each of said apertures is positioned adjacent an associated one of said informational characters and each of said teats cooperates with an associated one of said apertures to provide indication of an associated one of said characters.

6. A tag assembly as set forth in claim 1 wherein said attaching means comprises means for releasably attaching said information tag to the collar.

7. A tag assembly as set forth in claim 6 wherein said information tag comprises a plate having a generally rectangular body portion and integral mounting bracket portions at opposite ends of said body portion, each of said bracket portions having a slot therein for receiving an associated portion of a collar therethrough, said brackets comprising said means for releasably attaching said information tag.

8. A tag assembly for an animal insecticide collar as set forth in claim 1 wherein the duration of the potency period is at least 3 months and said characters indicate the names of at least 14 consecutive months arranged in chronological series and in a line along said information tag.

9. A tag assembly as set forth in claim 9 wherein said character marker in each of said positions overlies and substantially covers said characters which indicate the names of at least 3 successive months.

10. An identification tag assembly for an animal insecticide collar having a potency period of at least 3 months duration, said tag assembly comprising an identification plate having an elongated body portion of greater width than the collar, characters indicating the names of at least 14 consecutive months of the year arranged in chronological series along one longitudinally extending marginal portion of the body, means for releasably retaining said identification plate on the collar with a portion of said body generally overlying an associated portion of the collar and said marginal portion disposed transversely outwardly beyond a longitudinally extending side edge of the collar, a character marker, means for releasably securing said character marker to said marginal portion in any one of a plurality of preselected fixed indicating positions, said character marker in each of said indicating positions cooperating with said characters indicating the names of at least 3 consecutive months to provide indication of a period of at least 3 months duration substantially corresponding to the duration of the potency period.

11. An identification tag assembly for an animal insecticide collar as set forth in claim 10 wherein said identification plate includes a pair of mounting brackets respectively integrally connected to opposite ends of said body and bend out of the plane thereof, each of said mounting brackets having an opening therein for receiving the collar therethrough, each said opening having a cross-sectional configuration for substantially complementing the cross-sectional configuration of an associated portion of the collar when said identification plate is assembled therewith, said mounting brackets comprising said means for releasably retaining said identification plate on the collar.

12. An identification tag for an animal collar as set forth in claim 10 wherein said body has at least 14 apertures formed in the marginal portion thereof, each of said apertures being disposed generally adjacent an associated one of said characters indicating the name of one of said months, and said marker has a plurality of resilient teats thereon, each of said teats being adapted for insertion into snap engagement in associated ones of said apertures, said apertures and said teats comprising said means for releasably securing said marker.

13. The information tag assembly for attachment to a collar and comprising an information tag, indicia of a plurality of first units of time arranged in chronological series and in a line along said information tag, said first units of time collectively defining a whole second unit of time larger than said first unit and only a portion of the next chronologically successive second unit of time, a marker, and means for releasably retaining said marker in assembly with said information tag in any one of a plurality of preselected fixed positions, means on said marker for cooperating in each of said positions with a plurality of said first units of time to indicate a period of time having a duration greater than a first unit of time and less than a second unit of time and means for attaching said tag to the collar.

14. An information tag assembly as set forth in claim 13 wherein said first units of time comprise months of the year and said second unit of time comprises 1 year.

15. A tag assembly for an animal insecticide collar having a potency period of at least 3 months duration and comprising an information tag, means for attaching said information tag to the collar with a portion of said information tag overlying an associated portion of the collar and a marginal portion of said information tag projecting outwardly beyond the collar, characters indicating the names of at least 14 consecutive months disposed on said marginal portion and arranged in chronological series and in a line, a character marker, and means for securing said character marker to said information tag in a preselected one of a plurality of fixed positions, said character marker in each of said positions cooperating with a plurality of consecutive said characters to indicate a period of time substantially equal to the potency period of the collar.

16. A tag assembly as set forth in claim 15 wherein a lower surface portion of said information tag overlies an associated portion of the collar and said characters are disposed on the upper surface of said information tag.

* * * * *

UNITED STATES PATENT OFFICE
CERTIFICATE OF CORRECTION

Patent No. 3,879,870            Dated April 29, 1975

Inventor(s) George M. Bachand

It is certified that error appears in the above-identified patent and that said Letters Patent are hereby corrected as shown below:

Col. 4, line 32, "claim 9" should read --claim 8--

Signed and Sealed this twenty-ninth Day of July 1975

[SEAL]

Attest:

RUTH C. MASON
*Attesting Officer*

C. MARSHALL DANN
*Commissioner of Patents and Trademarks*